US 6,678,261 B1

(12) United States Patent
Kim et al.

(10) Patent No.: US 6,678,261 B1
(45) Date of Patent: Jan. 13, 2004

(54) TDMA MOBILE TERMINAL CAPABLE OF RECEIVING CELL BROADCAST SERVICE EVEN IN SPEECH DEDICATED MODE AND METHOD FOR CONTROLLING THE SAME

(75) Inventors: Seung-Hyo Kim, Suwon-shi (KR); Yoon-Sop Kang, Pusankwangok-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/215,836

(22) Filed: Dec. 17, 1998

(30) Foreign Application Priority Data

Dec. 17, 1997 (KR) .............................. 97-69980

(51) Int. Cl.[7] .............................. H04B 7/212; H04J 3/00
(52) U.S. Cl. ........................ 370/337; 370/347
(58) Field of Search ..................... 370/337, 459, 370/330, 436, 478, 347, 468, 493, 498, 529, 349; 455/566, 461, 414, 457

(56) References Cited

U.S. PATENT DOCUMENTS

| | | | | | |
|---|---|---|---|---|---|
| 5,577,047 A | * | 11/1996 | Persson et al. | ............. | 370/333 |
| 5,907,555 A | * | 5/1999 | Raith | .......................... | 370/468 |
| 5,991,286 A | * | 11/1999 | Labonte et al. | ............. | 370/337 |
| 5,995,500 A | * | 11/1999 | Ma et al. | ..................... | 370/337 |
| 5,995,515 A | * | 11/1999 | Suzuki | ........................ | 370/465 |
| 6,023,460 A | * | 2/2000 | Jackson et al. | ............. | 370/330 |
| 6,088,598 A | * | 7/2000 | Marsolais | ................... | 455/566 |
| 6,122,530 A | * | 9/2000 | Overy et al. | ................. | 455/566 |

* cited by examiner

Primary Examiner—Chau Nguyen
Assistant Examiner—Soon-Dong Hyun
(74) Attorney, Agent, or Firm—Dilworth & Barrese LLP

(57) ABSTRACT

A TDMA mobile terminal is provided capable of receiving a cell broadcast service even in a speech dedicated mode. The TDMA mobile terminal has a display and includes a controller for subtracting time slots necessary for a call from an overall number of time slots corresponding to a TDMA frame to obtain remaining time slots. The controller also receives cell broadcast information using the remaining time slots, and displays the received cell broadcast information on the display irrespective of a current operation mode.

10 Claims, 3 Drawing Sheets

TDMA MOBILE TERMINAL CAPABLE OF RECEIVING CELL BROADCAST SERVICE EVEN IN SPEECH DEDICATED MODE AND METHOD FOR CONTROLLING THE SAME

BACKGROUND OF THE INVENTION

1. Field of the Invention

The present invention relates generally to cell broadcast services in TDMA (Time Division Multiple Access) mobile communication systems and, in particular, to a TDMA mobile terminal capable of receiving a cell broadcast service even in a speech dedicated mode, and a method for controlling the same.

2. Description of the Related Art

Today, many communication service providers support a cell broadcast service for providing the subscribers with cell broadcasting information such as, for example, weather information and traffic information. The cell broadcast information is transmitted from a base station to mobile stations (i.e., mobile terminals) only in a cell broadcast dedicated mode through a SDCCH(2) channel (Stand alone Dedicated Control Channel 2). The SDCCH(2) channel is commonly referred to as a SDCCH subchannel 2. The SDCCH(2) channel is used for the connection for signaling between the mobile station and a network. This connection is necessary for a position updating function and other management functions.

In receiving the cell broadcast service, upon power-up, the mobile station analyzes system information transmitted from the base station to check whether or not the received system information includes cell broadcast information. When the received system information includes cell broadcast information, a dedicated channel is allocated for the mobile station. The mobile station receives the cell broadcast information by opening a window in the SDCCH(2) channel of the dedicated channel which includes the cell broadcast information. The received cell broadcast information is then displayed through a display.

A conventional GSM (Global System for Mobile communication) terminal performs receiving, transmitting and monitoring operations in sequence for one TDMA frame (of about 4.615 ms) consisting of eight time slots. Therefore, in the speech dedicated mode (wherein the user talks with another party), the mobile station cannot receive the cell broadcast information.

FIG. 1 is a diagram illustrating the structure of a conventional unit TDMA frame. In FIG. 1, since a time slot TS0, an interval represented by Rx, is dedicated to the cell broadcast service and signaling, the user cannot talk with another party during time slot TS0. Therefore, the user should talk over the telephone using a frequency of a call dedicated channel and a newly allocated time slot number.

As stated above, two dedicated receiving channels are simultaneously required to receive the cell broadcast service and a call. However, a conventional GSM terminal does not simultaneously support both the call and the cell broadcast service. Occasionally, particularly when having a telephone conversation with the terminal placed on the cradle of a hands free kit, the user may need to receive cell broadcast information even in the speech dedicated mode.

SUMMARY OF THE INVENTION

It is therefore an object of the present invention to provide a TDMA mobile terminal capable of receiving a cell broadcast service even in a speech dedicated mode.

To achieve the above and other objects, a TDMA (Time Division Multiple Access) mobile terminal having a display is provided. The TDMA terminal comprises: a controller for receiving cell broadcast information on a dedicated channel using time slots remaining after subtracting (also known as excepting) time slots necessary for a call from one TDMA frame, and for displaying the received cell broadcast information on the display regardless of a current operation mode.

These and other objects, features and advantages of the present invention will become apparent from the following detail description of illustrative embodiments thereof, which is to be read in connection with the accompanying drawings.

DETAILED DESCRIPTION OF PREFERRED EMBODIMENTS

A preferred embodiment of the present invention will be described hereinbelow with reference to the accompanying drawings. In the following description, well known functions and constructions are not described in detail so as not to obscure the invention.

Figure 1:
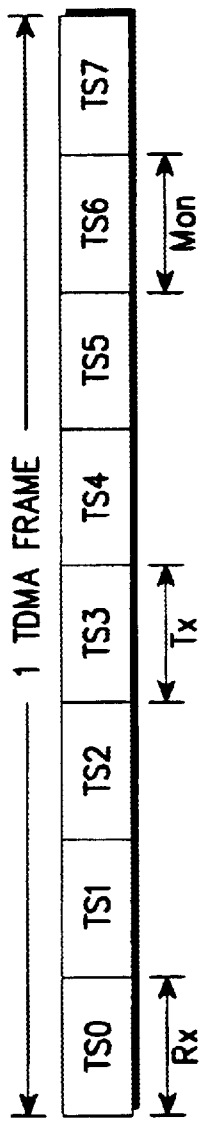
FIG. 1 is a diagram illustrating the structure of a conventional unit TDMA frame.
Figure 2:
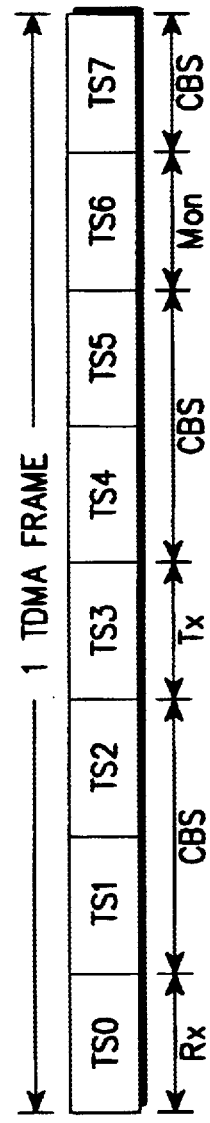
FIG. 2 is a diagram illustrating a unit TDMA frame according to an embodiment of the present invention.

FIG. 2 illustrates a unit TDMA frame according to an embodiment of the present invention. Excluding the time slots necessary for receiving, transmitting and monitoring operations, the GSM telephone still has several remaining time slots. Therefore, according to the embodiment of the present invention, intervals represented by CBS (cell broadcast service) denote intervals where the GSM telephone can receive the cell broadcast service. That is, cell broadcast information may be received through the remaining time slots of the dedicated channel and displayed, thereby providing the cell broadcasting service to the user even in the speech dedicated mode.

Figure 3:
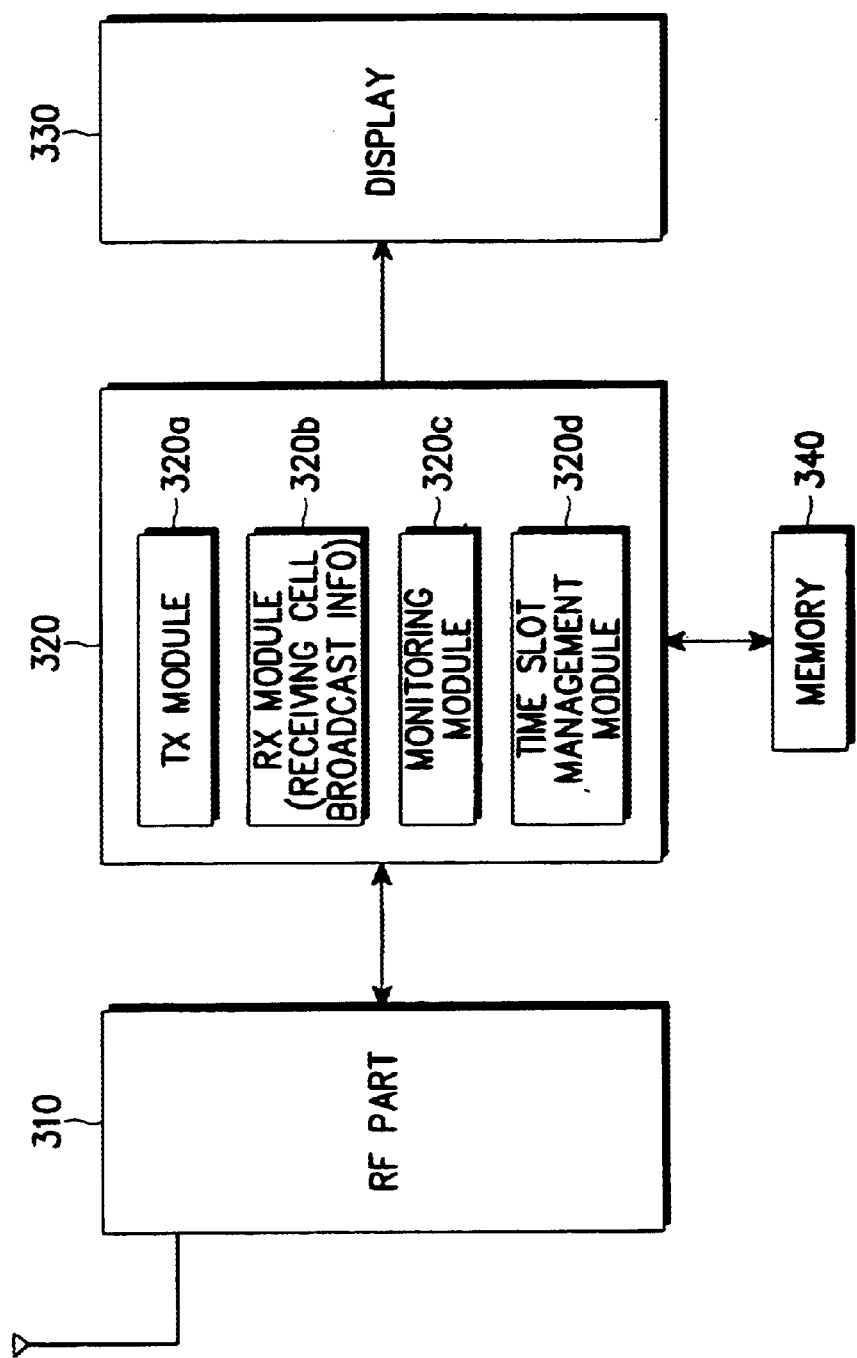
FIG. 3 is a block diagram of a GSM telephone capable of receiving a cell broadcast service even in a speech dedicated mode according to an embodiment of the present invention.

FIG. 3 illustrates a block diagram of a GSM telephone capable of receiving the cell broadcast service even in the speech dedicated mode, according to an embodiment of the present invention. A controller 320 is operatively coupled to an RF (radio frequency) part 310, a memory 340, and a display 330. The RF part 310 performs a known radio data transmission/reception function. The controller 320 controls the overall operations of the GSM mobile telephone and includes a transmitting (TX) module 320a, a receiving (RX) module 320b, a monitoring module 320c, and a time slot management module 320d. The receiving module 320b has a cell broadcast information receiving function in addition to an existing receiving function. The time slot management module 320d manages the time slots remaining after the time slots necessary for transmitting, receiving and monitoring operations have been subtracted from the overall number of time slots corresponding to a unit frame. The memory 340 stores time slot number and frequency number for a cell broadcast channel.

Figure 4:
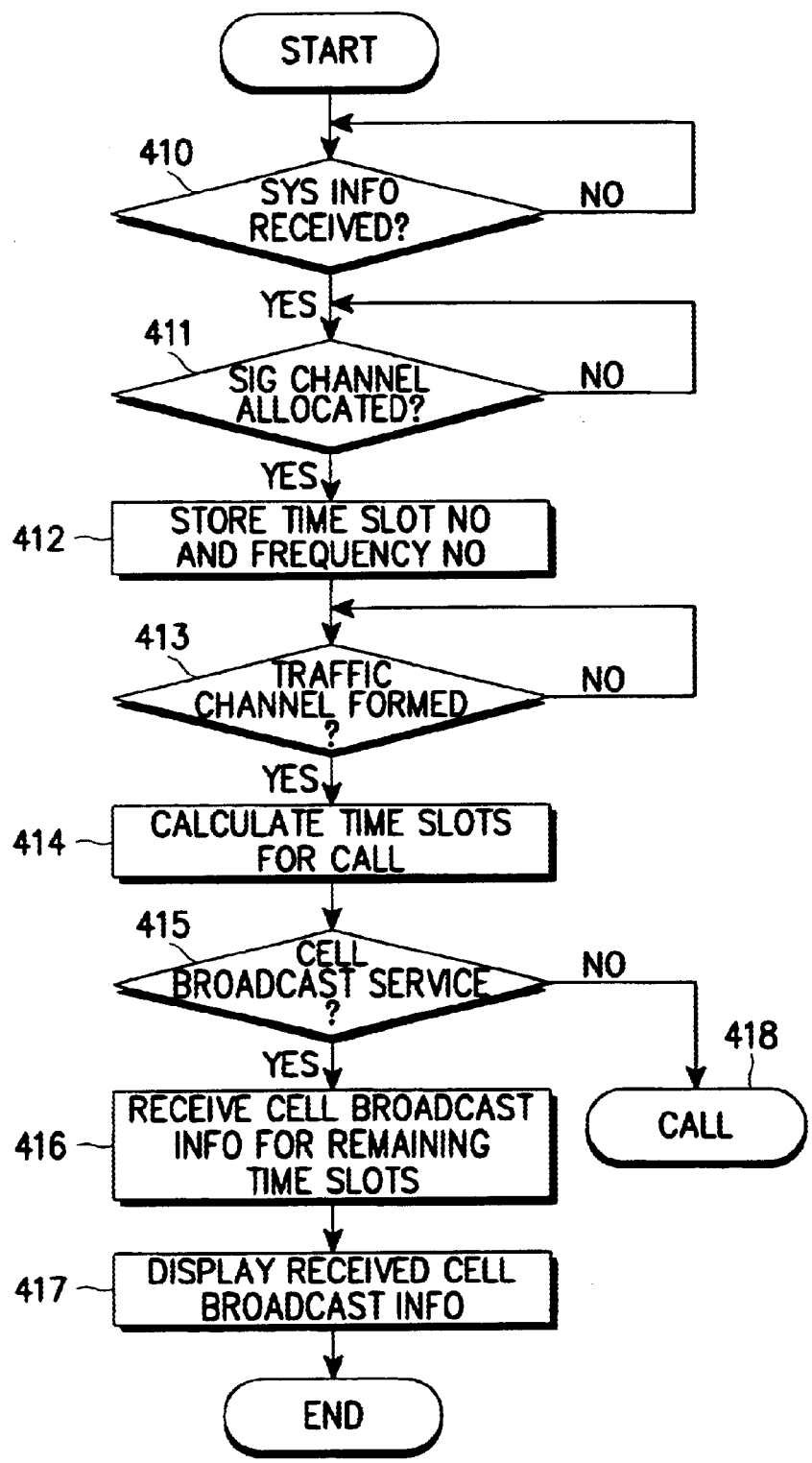
FIG. 4 is a flowchart illustrating a cell broadcast service control method according to an embodiment of the present invention.

FIG. 4 is a flowchart illustrating a cell broadcast service control method according to an embodiment of the present invention. The controller 320 receives system information in an idle mode in step 410 and judges whether or not the received system information includes cell broadcast information (i.e., the time slot number and the frequency number for the cell broadcast channel). When the system information includes cell broadcast information, controller 320 extracts the cell broadcast information from the system information and stores the cell broadcast information in memory 340. After storing the extracted cell broadcast information, controller 320 then judges whether or not a signaling channel is allocated therefor (step 411). If so, then controller 320 stores the time slot number and the frequency number of the allocated signaling channel in memory 340 (step 412). Here, one signaling channel is selected from actual channels, and a name of a logical channel is determined based on its logical function.

In the meantime, if a traffic channel is formed, then controller 320 detects the traffic channel (step 413). Upon detection of the traffic channel, controller 320 calculates the time slots in one frame necessary for the call, and checks the remaining time slots (step 414). That is, the controller determines the time slots remaining after the time slots necessary for transmitting, receiving and monitoring operations have been subtracted from the overall number of time slots corresponding to a unit frame (i.e., 8 time slots STO–ST7).

The controller 320 then judges whether or not cell broadcast information (such as, for example, weather information and traffic information) is included in the received system information (step 415). If so, then controller 320 reads the time slot number and the frequency number for the cell broadcast channel from memory 340 and receives the cell broadcast information on the dedicated channel according to the read numbers by using the remaining time slots and not the time slots corresponding to the call (step 416). Subsequently, controller 320 displays the received cell broadcast information on display 330 (step 417). However, if it is judged in step 415 that the cell broadcast information is not included in the received system information, then controller 320 provides normal call service (step 418).

As described above, the TDMA mobile terminal according to the invention can receive the cell broadcast information even in the speech dedicated mode. Thus, the user can receive the cell broadcast information, even while having a telephone conversation with the mobile terminal placed on the cradle of a hands free kit. Accordingly, it is possible to increase the utility and convenience of the mobile terminal.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A TDMA (Time Division Multiple Access) mobile terminal having a display, comprising:
   a controller programmed to except receiving, transmitting and monitoring time slots necessary for a call from an overall number of time slots corresponding to a TDMA frame allocated to said mobile terminal to obtain remaining time slots, to receive cell broadcast information using the remaining time slots, and to display the received cell broadcast information on the display irrespective of a current operation mode, said cell broadcast information consisting of information transmitted for the convenience of a user.

2. The TDMA mobile terminal as claimed in claim 1, wherein said cell broadcast information is received from a dedicated channel corresponding to the TDMA frame.

3. The TDMA mobile terminal as claimed in claim 1, wherein said controller displays the received cell broadcast information while the TDMA mobile terminal is in a speech dedicated mode.

4. The TDMA mobile terminal as claimed in claim 3, wherein the mobile terminal is placed on a cradle of a hands free kit, when the mobile terminal is in the speech dedicated mode.

5. A cell broadcast service control method in a TDMA (Time Division Multiple Access) mobile terminal having a display, comprising the steps of:
   excepting receiving, transmitting and monitoring time slots necessary for a call from an overall number of time slots corresponding to a TDMA frame allocated to said mobile terminal to obtain remaining time slots;
   receiving cell broadcast information using the remaining time slots; and
   displaying the received cell broadcast information on the display irrespective of a current operation mode, said cell broadcast information consisting of information transmitted for the convenience of a user.

6. The cell broadcast service control method of claim 5, wherein said excepting step is performed when the formation of a traffic channel is detected.

7. The cell broadcast service control method of claim 5, wherein said cell broadcast information is received from a dedicated channel corresponding to the TDMA frame.

8. A cell broadcast service control method in a TDMA mobile terminal, comprising the steps of:
   receiving system information in an idle mode and judging whether the received system information includes cell broadcast information;
   receiving a signaling channel allocated to the TDMA mobile terminal, and storing a time slot number and a frequency number of the signaling channel;
   determining time slots remaining after excepting receiving, transmitting and monitoring time slots necessary for a call from a TDMA frame allocated to said mobile terminal, when the formation of a traffic channel is detected;
   receiving the cell broadcast information from a dedicated channel using the remaining time slots, when the system information includes the cell broadcast information; and
   displaying the received cell broadcast information on a display, said cell broadcast information consisting of information transmitted for the convenience of a user.

9. The cell broadcast service control method of claim 8, further comprising the step of judging whether the received system information includes cell broadcast information.

10. A cell broadcast service control method in a TDMA (Time Division Multiple Access) mobile terminal having a display, comprising the steps of:
   excepting receiving, transmitting and monitoring time slots necessary for a call from an overall number of time slots corresponding to a TDMA frame allocated to said mobile terminal to obtain remaining time slots when the formation of a traffic channel is detected;
   receiving cell broadcast information using the remaining time slots; and
   displaying the received cell broadcast information on the display irrespective of a current operation mode, said cell broadcast information consisting of information transmitted for the convenience of a user.

* * * * *